Oct. 14, 1958  G. T. GRAVES  2,856,023
PROGRESSIVE METERING VALVE AND FLUID
PRESSURE SYSTEM UTILIZING SAME
Filed Feb. 1, 1956  4 Sheets-Sheet 1

INVENTOR.
GEORGE T. GRAVES
BY
Oberlin & Limbach
ATTORNEYS

INVENTOR.
GEORGE T. GRAVES
BY
Oberlin & Limbach
ATTORNEYS.

INVENTOR.
GEORGE T. GRAVES
BY
Oberlin & Limbach
ATTORNEYS.

Oct. 14, 1958                G. T. GRAVES                    2,856,023
          PROGRESSIVE METERING VALVE AND FLUID
               PRESSURE SYSTEM UTILIZING SAME
Filed Feb. 1, 1956                              4 Sheets-Sheet 4

INVENTOR.
GEORGE T. GRAVES
BY
Oberlin & Limbach
ATTORNEYS

United States Patent Office 2,856,023
Patented Oct. 14, 1958

2,856,023

PROGRESSIVE METERING VALVE AND FLUID PRESSURE SYSTEM UTILIZING SAME

George T. Graves, Walton Hills, Ohio, assignor to The Farval Corporation, Cleveland, Ohio, a corporation of Ohio Application February 1, 1956, Serial No. 562,864

21 Claims. (Cl. 184—7)

This invention relates as indicated to a novel progressive metering valve and a fluid pressure system utilizing the same, and more particularly to such valve and system especially adapted for the lubrication of bearings and the like in machinery.

It has long been customary in the manufacture of machine tools of moderate size to provide a lubricant sump in the base of the machine housing and a pump operative continuously to force oil to the top of the housing from which it is led by gravity, without metering, through various channels to those underlying bearings requiring lubrication. This is known in the art as a "cascade" system. On very large machinery, however, the provision of a completely enclosing housing with the necessary internal channeling has ordinarily been regarded as too costly. Furthermore, it is often difficult to ensure an adequate supply of lubricant to widely separated bearings without employing some form of metering device. The large presses used in automobile body work, for example, have until recently been in this latter category, and for this reason it has been customary to lubricate them with a grease of sufficient consistency to stay put once applied and the lubrication of the large but widely spaced bearings on such machines which sometimes attain a height of three or four stories has often been provided for by the use of Farval Dualine systems. A lubricant and metering system of this general type is described in U. S. Patent 2,708,984 to George H. Acker.

Recently the automotive manufacturers have become increasingly critical of the housekeeping problem presented by the steady accumulation of grease on the outside of such grease lubricated presses and the like and since such machinery is now largely fabricated using welded construction instead of castings, it has been found feasible to provide suitable enclosures to provide for return of fluid lubricants to a sump without excessive expense. It is still necessary to provide some means of metering adequate amounts of lubricant to each bearing and since a fluid lubricant which will return to a sump will not adhere to the bearing surfaces for any very great period of time where provision for its run-off is made, and such bearings are quickly destroyed if operated without lubricant, it becomes desirable not only to meter the lubricant to the bearings but also to provide some protective mechanism that will give warning of failure of the metering system before bearing failure takes place. Attempts have been made in the past to meet these requirements but have required a very high rate of lubricant flow, commonly around a pint per minute per lubricating valve, in order to function satisfactorily, this being a much higher rate of flow than is required by the bearing being lubricated. Naturally, such systems have been quite expensive.

It is accordingly an important object of the present invention to provide a relatively low cost fluid pressure system which will meter lubricant to the bearings at the proper rate for proper lubrication of the latter without requiring an excessive lubricant flow rate to ensure the proper operation and safety of the system.

Another object is to provide a novel progressive metering valve adapted to be incorporated in a closed circuit fluid pressure system for positive automatic sequential operation at predetermined intervals.

Still another object is to provide such valve and system which will be relatively inexpensive both in first cost and in operation.

A further object is to provide a novel flow directing valve for intermittently reversing the direction of flow of fluid through such system.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
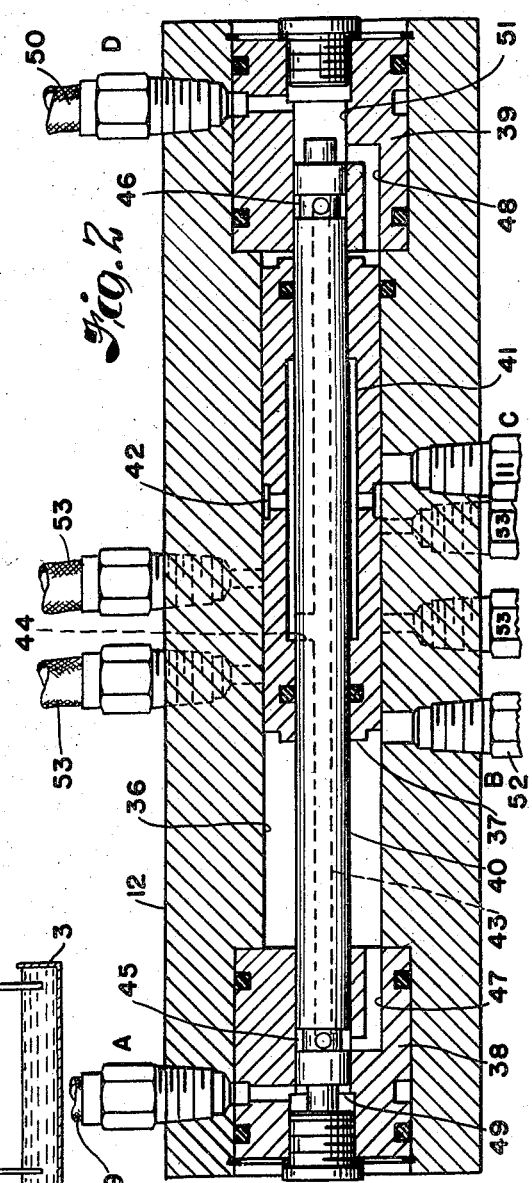
Fig. 2 is a longitudinal section through a progressive multi-outlet measuring valve adapted to be incorporated in such system.
Figure 10:
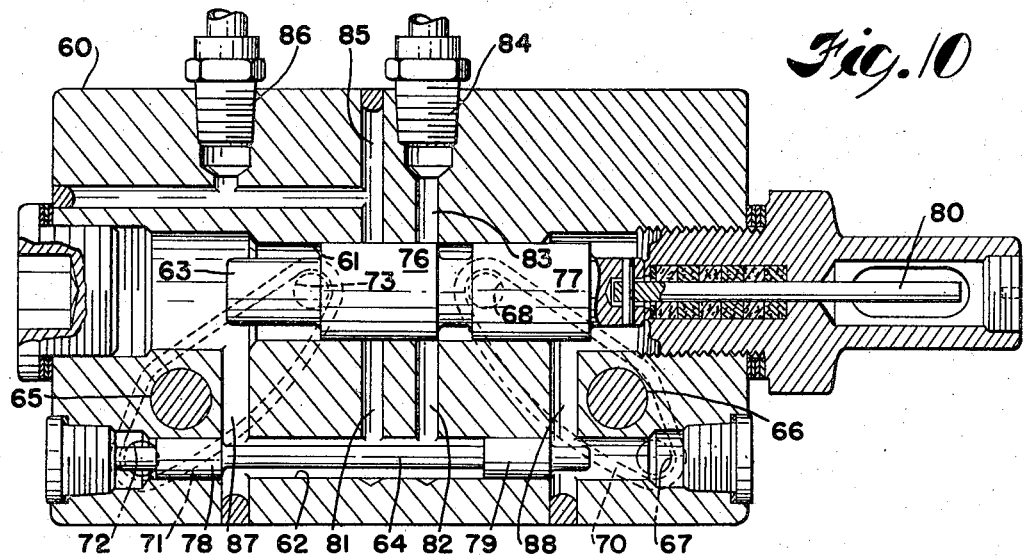
Figure 11:
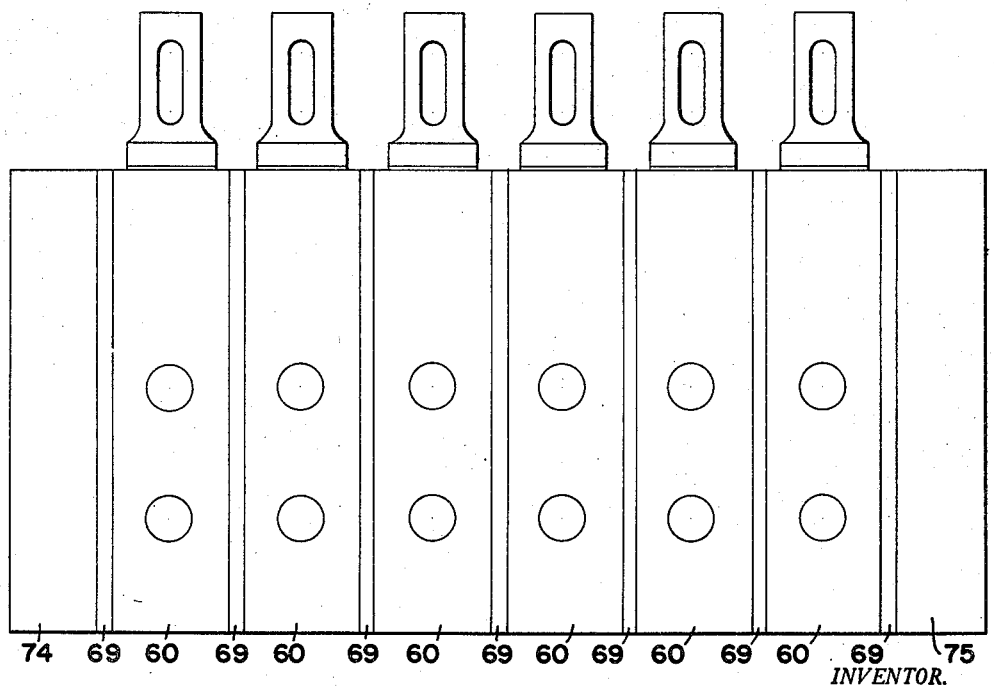

Figs. 4–9 inclusive are diagrammatic longitudinal sections through a measuring valve corresponding to Fig. 2 showing successive stages in one cycle of its operation;

Fig. 10 is a longitudinal section through a modified form of measuring valve; and Fig. 11 is an assembly of such latter valves with interposed spacer plates.

Figure 3:
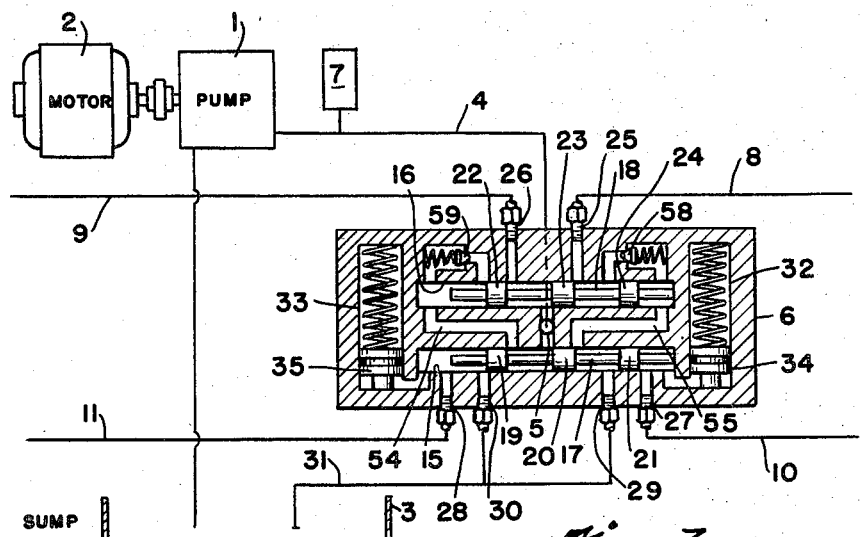
Fig. 3 is a fragmentary illustration of a portion of the fluid pressure system of Fig. 1 showing the flow directing valve in action.
Figure 4:
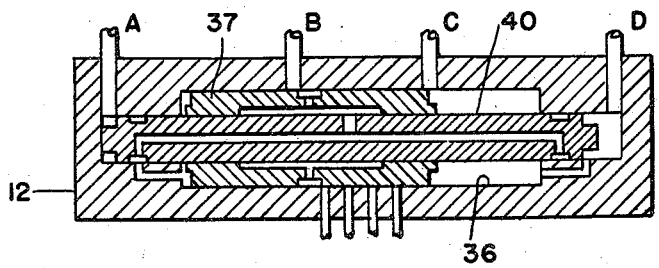
Figure 5:
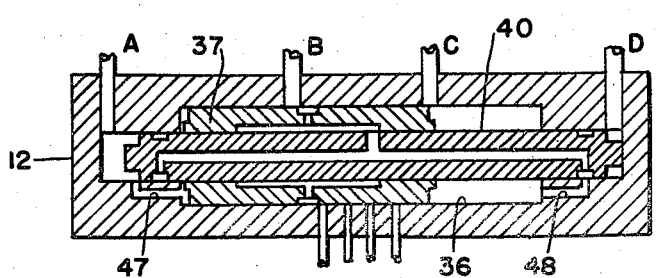

Referring now more particularly to said drawing and especially Figs. 1 and 3 thereof, the general features of my new fluid pressure system will first be described. A pump 1 is driven by electric motor 2 to draw lubricating oil from a sump 3 and to supply a continuous flow of such oil through a pressure supply line 4 to a centrally located inlet 5 of flow directing valve 6. A high-low pressure switch 7 may be connected into this pressure supply line 4 to actuate alarm signals or suitable electrical safety devices in the event pressure in this line should fall below or exceed pre-set limits.

Two pressure lines 8 and 9 lead from flow directing valve 6 and two return lines 10 and 11 return thereto. Such pressure lines are adapted to be pressurized alternately with excess fluid returning to valve 6 through such return lines alternately. A plurality of outlet measuring valves such as 12, 13 and 14 are connected in series as shown in Fig. 1 to deliver measured charges of lubricant to the various bearings when lines 8 and 9 are alternately pressurized through shifting of flow directing valve 6.

The flow directing valve 6 contains two parallel cylindrical bores 15 and 16 within which pistons 17 and 18 are respectively fitted for reciprocation. Piston 17 has three spaced shoulders 19, 20 and 21 and piston 18 similarly has three spaced shoulders 22, 23 and 24. Pressure lines 8 and 9 communicate with bore 16 through longitudinally spaced lateral ports 25 and 26. Return lines 10 and 11 communicate with bore 15 through ports 27 and 28. Between such two latter ports are located outlet ports 29 and 30 both connected to relief line 31 leading to sump 3. The respective ends of bore 15 communicate with pressure accumulator cylinders 32 and 33 containing spring-backed pistons 34 and 35.

Now referring to Fig. 2, the construction of outlet measuring valve 12 may be described more in detail. Such valve is provided with a main longitudinally extending internal bore 36 within which piston 37 is fitted for reciprocation between end members 38 and 39. An elongated inner piston 40 is fitted for reciprocation axially in piston 37, the respective ends of piston 40 protruding from the latter. Such piston 37 is provided with an inner chamber 41 communicating with an annular recess 42 in its outer periphery. Elongated inner piston 40 has an axially extending bore 43 having a lateral passage 44 disposed always to communicate with the interior of chamber 41 regardless of the reciprocation or relative reciprocation of pistons 37 and 40. The respective ends of passage 43 communicate with grooves 45 and 46 in the outer surface of piston 40 adjacent the ends of the latter, the reciprocation of piston 40 being limited so that such grooves 45 and 46 are always contained within end members 38 and 39 respectively and never communicate directly with main bore 36. Passages 47 and 48 in end members 38 and 39 respectively do, however, afford communication between such grooves 45 and 46 and bore 36 when piston 40 has been fully reciprocated in one direction or the other.

Pressure line 9 communicates through inlet port A with the end of bore 49 fitting piston 40 and line 50 communicates through port D with the end of bore 51 fitting the other end of piston 40. As shown in Fig. 2, when piston 40 is fully reciprocated, one of said ports A and D will be connected through passage 47 or 48 with main bore 36.

Figure 1:
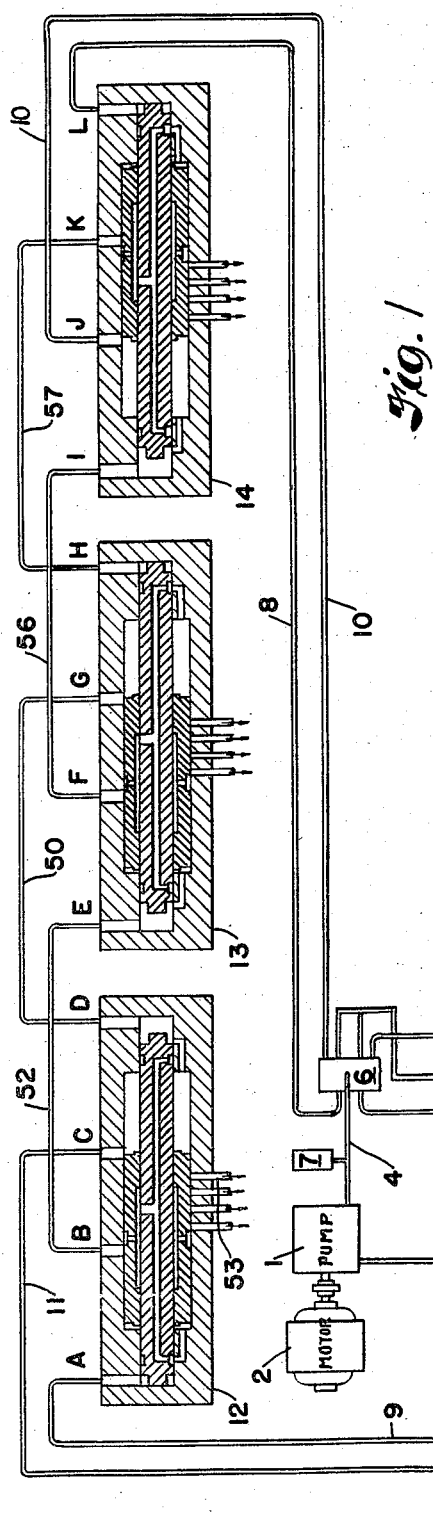
Fig. 1 is a diagrammatic layout of the fluid pressure system in accordance with my invention.

Return line 11 communicates with bore 36 through port C, and line 52 communicates with bore 36 through port B intermediate ports A and C, such line 52 leading to port E of the next measuring valve 13 (Fig. 1). A plurality of outlets 53 leading to the respective bearings likewise communicate laterally with bore 36 and may be circumferentially spaced in order to afford convenient access to the necessary fittings.

*Operation*

The operation of the above-described valves and system including the same may now be explained with additional reference to Figs. 4–9 inclusive of the drawing. As shown in Fig. 3, the flow directing piston 18 is shifted to the right and fluid flow from line 4 is consequently directed into pressure line 9 leading to inlet A of measuring valve 12, inlet 5 and outlet 26 of valve 6 being located between shoulders 22 and 23 of piston 18 when the latter is in right-hand position. Inlet 5 from pressure supply line 4 also communicates with passage 54 between shoulders 19 and 20 of pilot piston 17, such passage 54 leading to the left-hand end of bore 16 and thus holding piston 18 in such indicated right-hand position. It will be noted that passage 55 corresponding to passage 54 serves to relieve the right-hand end of piston 18 of pressure, passage 55 communicating with bore 15 intermediate shoulders 20 and 21 of piston 17 and thereby connecting to relief line 31 through port 29.

The pump discharge accordingly passes through line 4, flow directing valve 6 and line 9 to inlet port A of measuring valve 12, forcing the inner piston 40 to the right (Fig. 5) but with piston 37 as yet still in left-hand position. Of course, such reciprocation of piston 40 from its Fig. 4 to its Fig. 5 position serves to force a certain amount of fluid through outlet D and line 50 to inlet G in the next measuring valve 13 of the system. Inasmuch as ports G and F of such latter valve are in communication as shown, this amount of fluid is expelled through port F into line 56 and inlet port I of the next succeeding measuring valve 14. Since ports I and J of such latter valve are in communication as shown, this amount of fluid passes out port J and into return line 10 (Fig. 1) leading to the right-hand end of bore 15 of flow directing valve 6, tending to shift piston 17 to the left (Fig. 3). However, the pressure in such return line 10 will be appreciably less than that in pressure line 9 in view of the normal pressure drop through the system. If, nevertheless, piston 17 is caused to shift slightly to the left, shoulder 19 will promptly block relief port 30 and further shifting of the piston is prevented in view of the back pressure in return line 11. No change in the porting of valve 6 accordingly takes place.

As further fluid flow enters port A (Fig. 5), inner piston 40 already having been shifted to the right, the hollow main piston 37 is now likewise shifted to the right, displacing some fluid from bore 36 through port C and thus into return line 11 (Fig. 1) to establish the back pressure in such line referred to above.

Figure 6:
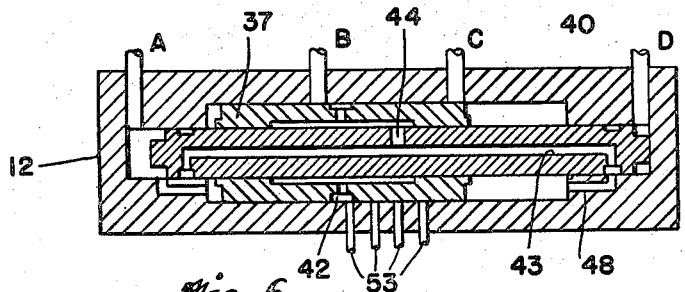
Figure 7:
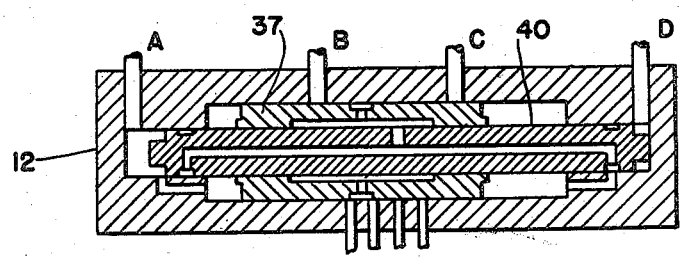
Figure 8:
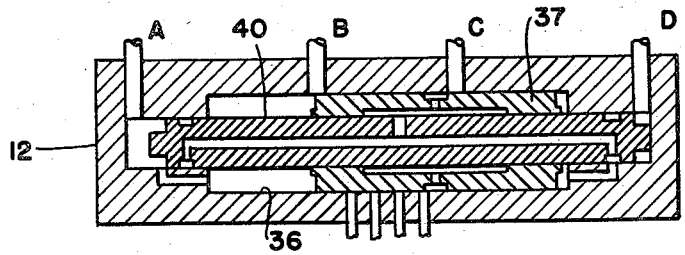

As shown in Fig. 6, piston 37 continues to reciprocate to close off port C and expelling lubricant through passages 48, 43, 44 and 42 into the several bearing lubricating fittings 53 in succession (see also Figs. 7 and 8).

When such piston 37 has nearly completed its reciprocation to the right (Fig. 8), bore 36 is placed in communication with outlet B so that pressure from line 9 entering port A is delivered through bore 36 and port B to line 52 leading to port E of the next measuring valve 13 (Fig. 1) which is accordingly now actuated in the same manner as valve 12, with the exception that no displacement is possible from port G back to port D. Instead, displacement resulting either from movement of the inner piston to the right or from the initial movement of the hollow main piston to the right (in valve 13) must serve to force lubricant out port F and through line 56 to port I of the next measuring valve 14, consequently causing partial operation of such latter valve.

Figure 9:
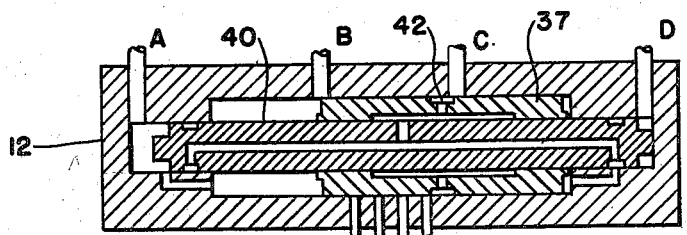

As shown in Fig. 9, when hollow piston 37 has completed its reciprocation to the right, each of the bearing fittings 53 will have been served and outlet port C may displace to relief. The full fluid flow from line 9 entering at port A exits through port B and passes on to the next valve 13. It has been found desirable to permit such slight degree of over-travel of hollow piston 37 thus to place port C in communication with annular channel 42 inasmuch as port C is thus connected to relief. In the case of the succeeding valves such as 13 and 14, however, there cannot be any such return through lines 50 and 57 as the return circuit is interrupted in valve 12. Otherwise, valves 13 and 14 function successively in the same manner as valve 12.

When the last lubricating valve in the system has been operated, fluid flow from line 9 now passes through all of the valves without effecting further movement thereof and through return line 10 back to the flow directing valve 6.

When lubricating valve 12 completed its cycle with the final shifting of hollow piston 37, there was no further flow from port C through line 11 to flow directing valve 6. Accordingly, the flow through return line 10 is now effective to force the pilot piston 17 to the left (Fig. 3), while at the same time raising piston 34, displacement of lubricant at the left-hand end of bore 15 being absorbed by movement of accumulator piston 35. Such shifting of piston 17 operates to connect the left-hand end of bore 16 to relief through passages 54 and port 30, and the right-hand end of bore 16 is now connected to pump pressure line 4 through inlet 5 and passage 55 so that piston 18 is shifted to the left. Such shifting of piston 18, of course, now directs the pump flow out through port 25 to pressure line 8. At the same time, return line 10 is connected to relief through port 29 and accumulator piston 34 (previously under pressure) is likewise unloaded to relief.

Check valve 58 serves to prevent flow of the pump delivery into pressure line 8 until piston 18 has been shifted, but it nevertheless permits complete movement of the inner piston 40 of the last lubricating valve 14 in the system by relief of displaced lubricant through port L and line 8 (not pressurized at that time, as shown in Fig.

3). Check valve 59, of course, serves a similar function during the ensuing cycle when the valve pistons of valve 6 have been shifted to the left as above described.

Since line 8 is now pressurized as above explained and line 9 is connected to relief through check valve 59, passage 54, and outlet 19, the valves 14, 13 and 12 will now be operated in that order.

In the fluid pressure system as above described, there will normally be no back pressure of any real significance encountered in the discharge lines 53 leading to the respective bearings, and consequently this system can be operated with a rather low pump pressure. The high pressure limit of the high-low pressure switch 7 in the pump discharge line 4 can be set somewhat above the normal system operating pressure; the low pressure limit can be set somewhat below it. As long as the pump is operating, the lubricating system will cycle and re-cycle automatically, metering oil successively to each bearing on each cycle. Should a valve jam or a discharge line develop a blockage, the pressure between the point of stoppage and the pump will rise, actuating such pressure switch. Similarly, if low oil level in the sump 3 or pump failure or a supply line break lowers the pressure in the pump discharge line, the pressure switch 7 will then be actuated. Actuation of a switch may be utilized as desired either to energize an alarm or to stop the machine before damage can be done to the bearings.

The frequency with which metered quantities of lubricant are fed to the bearings will depend upon the extent or number of the valves in the system and the rate of delivery of the pump 1. By varying the latter to suit the job, the system can readily be adapted to meet the requirements of any specific machine. Instead of utilizing a continuously operating pump (normally preferred), it is, of course, entirely feasible to provide timer means to control the pump motor, as well understood in the art.

Referring now more particularly to Figs. 10 and 11 of the drawing, a modified form of measuring valve is there illustrated operating upon a principle similar to that of the valve of Fig. 2 but constructed with two laterally spaced bores and pistons rather than utilizing concentric pistons. The valve of Fig. 10 is adapted to meter lubricant to two different bearings and comprises a block 60 having two parallel bores 61 and 62 in which pistons 63 and 64 are fitted for reciprocation respectively. Bolt holes 65 and 66 pass through the block for the purpose of joining a plurality of such blocks 60 together as shown in Fig. 11. Inlet 67 to the right-hand end of bore 62 may be connected to pressure supply line 8, such inlet corresponding to port L of valve 14 of Fig. 1. Outlet 68 leads from bore 61 and is adapted to communicate with the next valve in the manner explained below. It should be understood that inlet 67 and outlet 68 extend to opposite sides of the valve block 60. Accordingly, when a plurality of such valve blocks 60 are assembled in side-by-side relationship with spacer plates 69 interposed therebetween, the outlet 68 of one such valve may be placed in communication with the inlet 67 of the next valve by the provision of generally oval openings 70 located in such spacer plates in the region indicated in Fig. 10. Synthetic rubber O-rings will desirably be inserted in these openings so that when the manifold assembly is bolted together, such rings will be flattened slightly between the faces of the adjacent valve blocks leaving fluid passages from the outlet port 68 in one block to the inlet port 67 of the other block. A similar generally oval opening 71 is also provided in each spacer plate to connect inlet port 72 at the left-hand end of bore 62 with outlet port 73 in the left-hand end portion of bore 61 of the next adjacent valve. As will be understood, the outlets 68 and 73 extend to the same side of block 60 and the inlets 67 and 72 extend to the opposite side of such block.

Spacer plates 69 may also be employed between the endmost valve of the manifold and connector blocks 74 and 75 (Fig. 11). These latter connector blocks are, of course, drilled to accommodate the two bolts used to clamp the manifold together and will also be drilled and tapped in locations corresponding to inlets 67 and 72 for connecting with the alternate pressure and return lines of the Fig. 1 system. Of course, instead of employing spacer plates 69 in the manifold assembly, the valve blocks 60 may have passages formed therein to bring the outlets into direct juxtaposition to the inlets of the next block in the series, a counterbore being provided for an O-ring seal.

Piston 63 has two spaced shoulders 76 and 77 adapted alternately to close outlets 68 and 73 as the piston is reciprocated. Similarly, piston 64 has two widely axially spaced shoulders 78 and 79 adapted alternately to close off inlets 67 and 72 from the internal passages of valve block 60. An indicator stem 80 is connected to piston 63 for reciprocation therewith to show whether the valve is operating properly.

Passages 81 and 82 lead from bore 64 to bore 61 adjacent the mid-points thereof, a diametrically opposite extension 83 of passage 82 leading to outlet port 84 for delivery of lubricant to a bearing and a similar passage 85 diametrically opposite passage 81 leading to a second outlet 86 for lubrication of a second bearing. A passage 87 leads from the left-hand end of bore 61 to bore 62 and a similar passage 88 leads from the right-hand end of bore 61 to bore 62.

With inlet 67 receiving lubricant under pressure from line 8, the inlet piston 64 is shifted toward inlet port 72 as shown in Fig. 10, affording access to the incoming lubricant to the right-hand end of metering piston 63 through passage 88. Such shifting of piston 64 forces a certain amount of lubricant out through alternate inlet port 72, and pressure of lubricant against the right-hand end of metering piston 63 serves to shift such piston to the left, forcing lubricant out of the left-hand end of bore 61 through passage 87, bore 62, passage 82, the reduced region of piston 63 intermediate shoulders 76 and 77, and passage 83 to outlet port 84 serving one of the bearings. Initially, all of the valves in the manifold will be in the same operating position, e. g. with both pistons 63 and 64 at the extreme right.

While initial movement of piston 63 to the left may result in displacement of a small amount of lubricant through outlet 73 and on through the whole manifold to return line 11, the lower pressure resistance of the route above described leading to outlet 84 the moment that shoulder 76 cracks open passages 82 and 83 will cause the lubricant to follow such latter route by preference. Of course, as soon as outlet 73 is closed by shoulder 76, it has no other choice.

The circumferential groove between shoulders 76 and 77 of piston 63 is wide enough so that at mid travel of such piston flow of the displaced lubricant is initiated through passages 81 and 85 before flow to outlet 84 is completely discontinued, this permitting continued uninterrupted reciprocation of piston 63. Of course, passages 82 and 83 are thereafter completely closed off by shoulder 77 and further flow of the displaced lubricant is through passages 81 and 85 to outlet 86 servicing the other bearing.

As the metering piston 63 approaches its extreme left-hand position, shoulder 77 uncovers outlet 68 and subsequently closes off passages 81 and 85 leading to the second bearing. The lubricant flow from inlet 67 now passes out through outlet 68 to the corresponding inlet 67 of the next valve in the manifold which is thereupon operated in the same manner. When all of the valves in the manifold have been thus operated, the lubricant has free passage through pressure line 8 to return line 11 (Fig. 1) and the flow directing valve 6 thereupon operates to direct the pump delivery into pressure line 9 to operate the valves in a reverse cycle.

When utilizing a highly fluid oil in the system and with the bearing ports 53 open to the air to permit free discharge, the outgoing pressure at the flow reversing valve 6 approaches zero, particularly while the first measuring valve is discharging. In such cases it becomes a bit of a problem to provide an appropriate pressure switch 7 for safety purposes. This difficulty may be overcome, however, by providing small pressure-control check valves at the ends of the discharge lines 53 where they join the bearings, thereby ensuring that the minimum safe system operating pressure will have a workable value. The operating pressures of such check valves should be reasonably uniform and high enough to exceed any probable bearing flow resistance.

The pressure on the system will then tend to vary somewhat as successive measuring valves are operated, due in large part to the relief of the displacement of pistons 40 and 64. In the case of valve 60, this may be avoided by providing piston 63 with a sufficiently wide circumferential groove intermediate shoulders 76 and 77 to overlap one bearing outlet port (83 or 85) slightly as well as the adjacent line outlet port (68 or 73) when the metering piston 63 is at either extreme end of its reciprocation. Accordingly, when both pistons 63 and 64 have been reciprocated their full strokes in the same direction (so that the valve has fully operated), the lubricant flow then passes freely through such valve and on to the appropriate inlet of the next similar valve, reciprocating its pilot piston 64 and thereby forcing lubricant out through the other inlet such as 72 and back to the corresponding outlet of the preceding valve and thence out through the bearing port with which the latter is in communication. The succeeding valves will all function in like manner and consequently any fluctuation in the system operating pressure through varying relief resistance is substantially eliminated, permitting a minimum gap between high and low pressure limits held by switch 7.

A similar result is obtainable with the Fig. 2, valves by making groove 42 sufficiently wide and piston 37 sufficiently long (slightly longer than shown) so that at its extremes of travel it bears against cylinder head 38 or 39.

While pump 1 is shown driven by motor 2, it may, of course, be driven through any other agency, including the machine to be lubricated.

Other modes of applying the principle of the invention may be employed, change being made as regards the details described, provided the features stated in any of the following claims or the quivalent of such be employed.

I therefore particularly point out and distinctly claim as my invention:

1. A flow measuring and distributing valve having a first bore, a piston fitted for reciprocation therein, separate inlet passages leading respectively to each end of said bore, a second bore, a piston fitted for reciprocation in said second bore, connecting passages connecting each end of said first bore with a corresponding end of said second bore, said piston in said first bore being dimensioned alternately to close one said inlet passage when reciprocated from one end of said first bore to the other by admission of fluid under pressure through the other of said inlet passages, thereby also connecting said latter inlet the adjacent said connecting passage for admission thereto of such fluid under pressure with consequent reciprocation of said piston in said second bore; two separate outlet passages leading from said second bore symmetrically spaced to each side of the midpoint thereof, a plurality of delivery passages leading from said second bore distributed intermediate said outlet passages and adapted to receive and deliver fluid to bearings and the like, and an intermediate passage leading from said first bore to the mid-region of said second bore, the aforesaid reciprocation of said piston in said first bore also serving to place the other of said connecting passages in communication with the mid-region of said second bore through said first bore and intermediate passage, said piston in said second bore having a reduced section through which said latter connecting passage is successively placed in communication with said delivery passages to deliver fluid thereto displace from said second bore by reciprocation of said piston therein; the said outlet passage adjacent the end of said second bore receiving fluid under pressure being positioned to be cleared by said piston therein when said piston has been fully reciprocated toward the other end, thereby placing said inlet passage receiving fluid under pressure in communication with said latter outlet.

2. A flow measuring and distributing valve having a first bore, a piston fitted for reciprocation therein, separate inlet passages leading to the respective ends of said bore, a second bore, a piston fitted for reciprocation in said second bore, two separate outlet passages leading from said second bore symmetrically spaced to each side of the midpoint thereof, at least one delivery passage leading from said second bore intermediate said outlet passages, connecting passages connecting each end of said second bore with a corresponding end region of said first bore, and an intermediate passage leading from said first bore to said second bore and adapted temporarily to be placed in communication with said delivery passage by reciprocation of said piston in said second bore; whereby, upon admission of fluid under pressure to a selected said inlet said piston in said first bore is thereby shifted toward the other end of said bore to close said other inlet from communication with the said adjacent connecting passage, such movement of said piston in said first bore also serving to place said selected inlet in communication with the adjacent connecting passage to admit fluid under pressure to the corresponding end of said second bore and thereby shift said piston therein, such shifting of said latter piston first placing said intermediate passage in communication with said delivery passage to transmit fluid expelled from said second bore through said other connecting passage, and further shifting thereafter again interrupting such communication and uncovering said outlet nearest said inlet under pressure to permit escape of such fluid therethrough.

3. A series of valves each in accordance with claim 2, wherein the outlets of each valve in series except the last are connected to the corresponding inlets of the next succeeding valve, thereby ensuring successive operation thereof when pressurized.

4. A series of valves each in accordance with claim 2, wherein the outlets of each valve in series except the last are connected to the corresponding inlets of the next succeeding valve, thereby ensuring successive operation thereof when pressurized, a pump operative to deliver fluid under pressure, and a flow control valve operative to direct the pump delivery alternately to the respective said inlets of the first said distributing valve in said series.

5. A series of valves each in accordance with claim 2, wherein the outlets of each valve in series except the last are connected to the corresponding inlets of the next succeeding valve, thereby ensuring successive operation thereof when pressurized, a pump operative continuously to deliver fluid under pressure, a pressure switch connected with said pump delivery adapted to be operated when the pressure exceeds or drops below predetermined levels, and a flow control valve operative to direct the pump delivery alternatively to the respective said inlets of the first said distributing valve in said series.

6. A series of valves each in accordance with claim 2, wherein the outlets of each valve in series except the last are connected to the corresponding inlets of the next succeeding valve, thereby ensuring successive operation thereof when pressurized, a pump operative to deliver fluid under pressure, and a flow control valve operative to direct the pump delivery alternately to the respective said inlets of the first said distributing valve in said series, said flow control valve comprising a flow directing cylinder having a flow directing piston fitted for reciprocation therein, a pilot cylinder with a pilot piston fitted for reciprocation therein, accumulator cylinders communicating with each end of said pilot cylinder respectively, spring-backed pistons in each of said accumulator cylinders; a central passage connecting the central regions of said flow directing cylinder and said pilot cylinder, a pressure inlet to said latter passage from said pump, pressure lines leading from said flow directing cylinder on each side of said latter passage to said inlets of the respective endmost measuring valves of said series, three shoulders on said flow directing piston, the shifting of the central shoulder from one side to the other of said latter passage serving to determine which of said pressure lines is connected with said pressure inlet from said pump, by-passes from the respective ends of said flow directing cylinder back to said cylinder near the respective adjacent said pressure lines, the respective endmost said shoulders being adapted alternately to be interposed between the ports of a said by-pass and between a said pressure line and adjacent by-pass port as said flow directing piston is shifted, check valves in said by-passes permitting flow therethrough toward the respective ends of said flow directing cylinder only; passages leading from the respective ends of said flow directing cylinder to a central region of said pilot cylinder on each side of said central passage, return lines connected with the respective ends of said pilot cylinder and leading to said outlets of the respective endmost measuring valves of said series, and outlets from said pilot cylinder to relief adapted to be alternately separated from said respective adjacent return lines by the corresponding endmost shoulder of said pilot piston and connected therewith when said piston is shifted toward the other end of said pilot cylinder; whereby, with said pilot piston shifted to one end of its cylinder, incoming fluid from said pump is directed from said central passage through said pilot cylinder intermediate the central shoulder and opposite endmost shoulder of said pilot piston to said corresponding passage leading to an end of said flow directing cylinder to hold said flow directing piston in shifted position, such incoming fluid thereupon also being directed from said central passage through said flow directing cylinder intermediate the central shoulder and the endmost shoulder of said flow directing piston nearest said central passage to said pressure line nearest said latter shoulder, until the said return line leading to the end of said pilot cylinder toward which said pilot piston is shifted is pressurized after operation of all said measuring valves and thereupon shifts said pilot piston to the other end of said pilot cylinder with consequent fluid flow into said accumulator connected to said other end and also shifting of said flow directing piston to direct the pump output to the other said pressure line.

7. A flow control valve comprising a flow directing cylinder having a flow directing piston fitted for reciprocation therein, a pilot cylinder with a pilot piston fitted for reciprocation therein, accumulator cylinders communicating with each end of said pilot cylinder respectively, spring-backed pistons in each of said accumulator cylinders; a central passage connecting the central regions of said flow directing cylinder and said pilot cylinder, a pressure inlet to said latter passage, pressure lines leading from said flow directing cylinder on each side of said latter passage, three shoulders on said flow directing piston, the shifting of the central shoulder from one side to the other of said latter passage serving to determine which of said pressure lines is connected with said pressure inlet, by-passes from the respective ends of said flow directing cylinder back to said cylinder near the respective adjacent said pressure lines, the respective endmost said shoulders being adapted alternately to be interposed between the ports of a said by-pass and between a said pressure line and adjacent by-pass port as said flow directing piston is shifted, check valves in said by-passes permitting flow therethrough toward the respective ends of said flow directing cylinder only; passages leading from the respective ends of said flow directing cylinder to a central region of said pilot cylinder on each side of said central passage, return lines connected with the respective ends of said pilot cylinder, and outlets from said pilot cylinder to relief adapted to be alternately separated from said respective adjacent return lines by the corresponding endmost shoulder of said pilot piston and connected therewith when said piston is shifted toward the other end of said pilot cylinder; whereby, with said pilot piston shifted to one end of its cylinder, incoming fluid is directed from said central passage through said pilot cylinder intermediate the central shoulder and opposite endmost shoulder of said pilot piston to said corresponding passage leading to an end of said flow directing cylinder to hold said flow directing piston in shifted position, such incoming fluid thereupon also being directed from said central passage through said flow directing cylinder intermediate the central shoulder and the endmost shoulder of said flow directing piston nearest said central passage to said pressure line nearest said latter shoulder, until the said return line leading to the end of said pilot cylinder toward which said pilot piston is shifted is pressurized and thereupon shifts said pilot piston to the other end of said pilot cylinder with consequent fluid flow into said accumulator connected to said other end and also shifting of said flow directing piston to direct the incoming fluid from said central passage to the other said pressure line.

8. A flow directing valve having a pilot cylinder with fluid accumulators connected to the respective ends thereof, return ports leading to the respective ends of said cylinder, two relief ports leading from said cylinder equally spaced toward the midpoint of said cylinder from said respective return ports, a pilot piston fitted for reciprocation in said cylinder, a flow directing cylinder, two connecting passages connecting the respective ends of said flow directing cylinder to said pilot cylinder at points equally spaced toward the midpoint of said latter cylinder from said respective relief ports, by-passes leading from the respective ends of said flow directing cylinder back to said latter cylinder at points uniformly spaced from said ends to each side of the midpoint of said latter cylinder, check valves in said by-passes operative to permit fluid flow therethrough toward the respective ends of said latter cylinder only, fluid pressure outlets from said latter cylinder uniformly spaced toward the midpoint of said latter cylinder from said respective by-passes, a flow directing piston fitted in said latter cylinder, and a fluid pressure inlet communicating with both the midpoint of said flow directing cylinder and the midpoint of said pilot cylinder, said pilot piston having three shoulders disposed respectively to interpose between one said return port and the adjacent said relief port, between the adjacent said connecting passage and said fluid pressure inlet, and between said other relief port and said other connecting passage adjacent thereto when said pilot piston is fully reciprocated, and said flow directing piston having three shoulders disposed respectively to interpose between the two ends of one said by-pass, between the adjacent said fluid pressure outlet and said fluid pressure inlet, and between the other said fluid pressure outlet and the other said by-pass adjacent thereto when said flow directing piston is fully reciprocated.

9. A flow directing valve having a pilot cylinder with fluid accumulators connected to the respective ends thereof, return ports leading to the respective ends of said cylinder, two relief ports leading from said cylinder spaced toward each other from said respective return ports, a pilot piston fitted for reciprocation in said cylinder, a flow directing cylinder, two connecting passages connecting the respective ends of said flow directing cylinder to said pilot cylinder at points spaced toward each other from said respective relief ports, by-passes leading from the respective ends of said flow directing cylinder back to said latter cylinder at spaced points, check valves in said by-passes operative to permit fluid flow therethrough toward the respective ends of said latter cylinder only, spaced fluid pressure outlets from said latter cylinder intermediate said respective by-passes, a flow directing piston fitted in said flow directing cylinder, and a fluid pressure inlet communicating with said flow directing cylinder intermediate said outlets and with said pilot cylinder intermediate said connecting passages, said pilot piston having three shoulders disposed respectively to interpose between one said return port and the adjacent said relief port, between the adjacent said connecting passage and said fluid pressure inlet, and between said other relief port and said other connecting passage adjacent thereto when said pilot piston is fully reciprocated, and said flow directing piston having three shoulders disposed respectively to interpose between the two ends of one said by-pass, between the adjacent said fluid pressure outlet and said fluid pressure inlet, and between the other said fluid pressure outlet and the other said by-pass adjacent thereto when said flow directing piston is fully reciprocated.

10. A flow measuring and distributing valve having a first bore, a piston fitted for reciprocation therein, separate inlet passages leading to the respective ends of said bore, a second bore, a piston fitted for reciprocation in said second bore, two separate outlet passages leading from said second bore symmetrically spaced to each side of the midpoint thereof, a plurality of delivery passages leading from said second bore at points spaced between said outlet passages, connecting passages connecting each end of said second bore with a corresponding end region of said first bore at points somewhat spaced toward each other from said respective inlets, and intermediate passages leading from the central region of said first bore to said second bore at points corresponding to said delivery passages; said piston in said first bore having two shoulders disposed respectively to be interposed between one said connecting passage and the adjacent said intermediate passage and between the other said connecting passage and the said inlet adjacent thereto when said later piston is fully reciprocated, and said piston in said second bore having two shoulders disposed respectively to be interposed between one said connecting passage and the adjacent said outlet and between said latter outlet and the adjacent said intermediate passage when said piston has been fully reciprocated in said second bore.

11. The valve of claim 10 wherein said shoulders of said piston in said second bore are spaced apart sufficiently for the space therebetween to communicate slightly with one said outlet port while at the same time communicating slightly with an adjacent said delivery passage when said piston is fully reciprocated.

12. A flow measuring and distributing valve having a first bore, a piston fitted for reciprocation therein, separate inlet passages leading to the respective ends of said bore, a second bore, a piston fitted for reciprocation in said second bore, two separate outlet passages leading from said second bore spaced from each other and from the respective ends of said latter bore, a delivery passage leading from said second bore intermediate said outlet passages, connecting passages connecting each end of said second bore with a corresponding end region of said first bore at points somewhat spaced toward each other from said respective inlets, and an intermediate passage leading from the central region of said first bore to the region of said second bore with which said delivery passage communicates; said piston in said first bore having two shoulders disposed respectively to be interposed between one said connecting passage and the adjacent said intermediate passage and between the other said connecting passage and the said inlet adjacent thereto when said latter piston is fully reciprocated, and said piston in said second bore having two shoulders disposed respectively to be interposed between one said connecting passage and the adjacent said outlet and between said latter outlet and the adjacent said intermediate passage when said piston has been fully reciprocated in said second bore.

13. A series of valves each in accordance with claim 12, wherein the outlets of each valve in series except the last are connected to the corresponding inlets of the next succeeding valve, thereby ensuring successive operation thereof when pressurized.

14. A series of valves each in accordance with claim 12, wherein the outlets of each valve in series except the last are connected to the corresponding inlets of the next succeeding valve, thereby ensuring successive operation thereof when pressurized, said valves being assembled together with interposed spacer plates slotted to afford passages thus connecting said outlets with said corresponding inlets.

15. A series of valves each in accordance with claim 12, wherein the outlets of each valve in series except the last are connected to the corresponding inlets of the next succeeding valve, thereby ensuring successive operation thereof when pressurized, a pump operative to deliver fluid under pressure, and a flow control valve operative to direct the pump delivery alternately to the respective said inlets of the first said distributing valve in said series.

16. A measuring valve comprising co-axial inner and outer bores, an outer piston fitted for reciprocation in said outer bore, said inner bore consisting of co-axial extensions of said outer bore and also passing through said piston, an inner piston fitting in said extensions and outer piston, fluid pressure inlets to the respective ends of said extensions whereby said inner piston may be reciprocated by alternately admitting fluid under pressure thereto, connecting passages extending from the respective ends of said outer bore to said corresponding extensions at points spaced from the ends of the latter, peripheral grooves in said inner piston adjacent the ends thereof disposed alternately to communicate with the corresponding said connecting passage when said inner piston has been reciprocated to the corresponding end of said inner bore, a passage extending longitudinally through said inner piston connecting said grooves, said outer piston having an inner cavity therein of greater diameter than said inner bore, a lateral passage from said longitudinal passage communicating with said cavity in all positions of relative reciprocation of said pistons, an outer peripheral groove about the longitudinal midpoint of said outer piston, a passage from said cavity to said latter groove, two outlets from said outer bore spaced equally to each side of the midpoint of the latter and adapted alternately to be uncovered by said outer piston when the latter is reciprocated in opposite directions, and a plurality of delivery ports in said outer bore disposed intermediate said two outlets adapted sequentially to communicate with said latter groove when said outer piston is thus reciprocated, the stroke of said outer piston being too short also to pass beyond said delivery ports; whereby, upon admission of fluid under pressure to a selected said inlet said inner piston will thereby be shifted toward the other end of said inner bore to close said other inlet from communication with the adjacent connecting passage, such shifting of said inner piston also serving to place said selected inlet in communication with the adjacent connecting passage to admit fluid under pressure to the corresponding end of said outer bore and thereby shift said outer piston therein, such shifting of said outer piston first placing said peripheral groove therein in communication with one of said delivery passages and covering said previously open outlet to transmit fluid expelled from said outer bore through said other connecting passage, said longitudinal passage, and said cavity to said delivery passages sequentially, and final movement of said outer piston covering said delivery passages and uncovering said outlet nearest said inlet under pressure to permit escape of such fluid therethrough.

17. A series of valves each in accordance with claim 16, wherein the outlets of each valve in series except the last are connected to the corresponding inlets of the next succeeding valve, thereby ensuring successive operation thereof when pressurized.

18. A series of valves each in accordance with claim 16, wherein the outlets of each valve in series except the last are connected to the corresponding inlets of the next succeeding valve, thereby ensuring successive operation thereof when pressurized, a pump operative to deliver fluid under pressure, and a flow control valve operative to direct the pump delivery alternately to the respective said inlets of the first said distributing valve in said series.

19. The valve of claim 16, wherein said groove in said outer piston slightly overlaps an adjacent said outlet and also an adjacent said delivery port when said outer piston is fully reciprocated.

20. A measuring valve comprising a bore, a piston fitted for reciprocation in said bore, said bore having an enlarged portion intermediate its ends forming a second bore, a second piston fitting in said larger bore and sleeved on said first piston for relative reciprocation, fluid pressure inlets to the respective ends of said first bore to admit fluid to reciprocate said first piston, passages leading from the respective end portions of said first bore to the corresponding ends of said enlarged second bore adapted to be alternately uncovered by such opposite reciprocation of said first piston to admit fluid from said respective inlets to the corresponding ends of said second bore, thereby to reciprocate said second piston, and outlets from said second bore sequentially valved by said second piston arranged to receive fluid expelled from said second bore by such movement of said second piston therein.

21. A valve assembly comprising a plurality of valves, each of which is a flow measuring and distributing valve having a first bore, a piston fitted for reciprocation therein, separate inlet passages leading to the respective ends of said bore, a second bore, a piston fitted for reciprocation in said second bore, two separate outlet passages leading from said second bore spaced from each other and from the respective ends of said latter bore, a delivery passage leading from said second bore intermediate said outlet passages, connecting pasages connecting each end of said second bore with a corresponding end region of said first bore at points somewhat spaced toward each other from said respective inlets, and an intermediate passage leading from the central region of said first bore to the region of said second bore with which said delivery passage communicates; said piston in said first bore having two shoulders disposed respectively to be interposed between one said connecting passage and the adjacent said intermediate passage and between the other said connecting passage and the said inlet adjacent thereto when said latter piston is fully reciprocated, and said piston in said second bore having two shoulders disposed respectively to be interposed between one said connecting passage and the adjacent said outlet and between said latter outlet and the adjacent said intermediate passage when said piston has been fully reciprocated in said second bore; said plurality of said valves being assembled in series with the outlets of each valve except the last connected to the corresponding inlets of the next succeeding valve, thereby ensuring successive operation when pressurized.

References Cited in the file of this patent

UNITED STATES PATENTS

| | | |
|---|---|---|
| 2,006,181 | Reswick | June 25, 1935 |
| 2,022,005 | Leonard | Nov. 26, 1935 |
| 2,094,271 | Hillis | Sept. 28, 1937 |
| 2,115,637 | Leonard | April 26, 1938 |
| 2,346,801 | Venable | April 18, 1944 |
| 2,635,710 | Tear | April 21, 1953 |
| 2,690,816 | Pawling | Oct. 5, 1954 |
| 2,708,984 | Acker | May 24, 1955 |